United States Patent Office 3,294,657
Patented Dec. 27, 1966

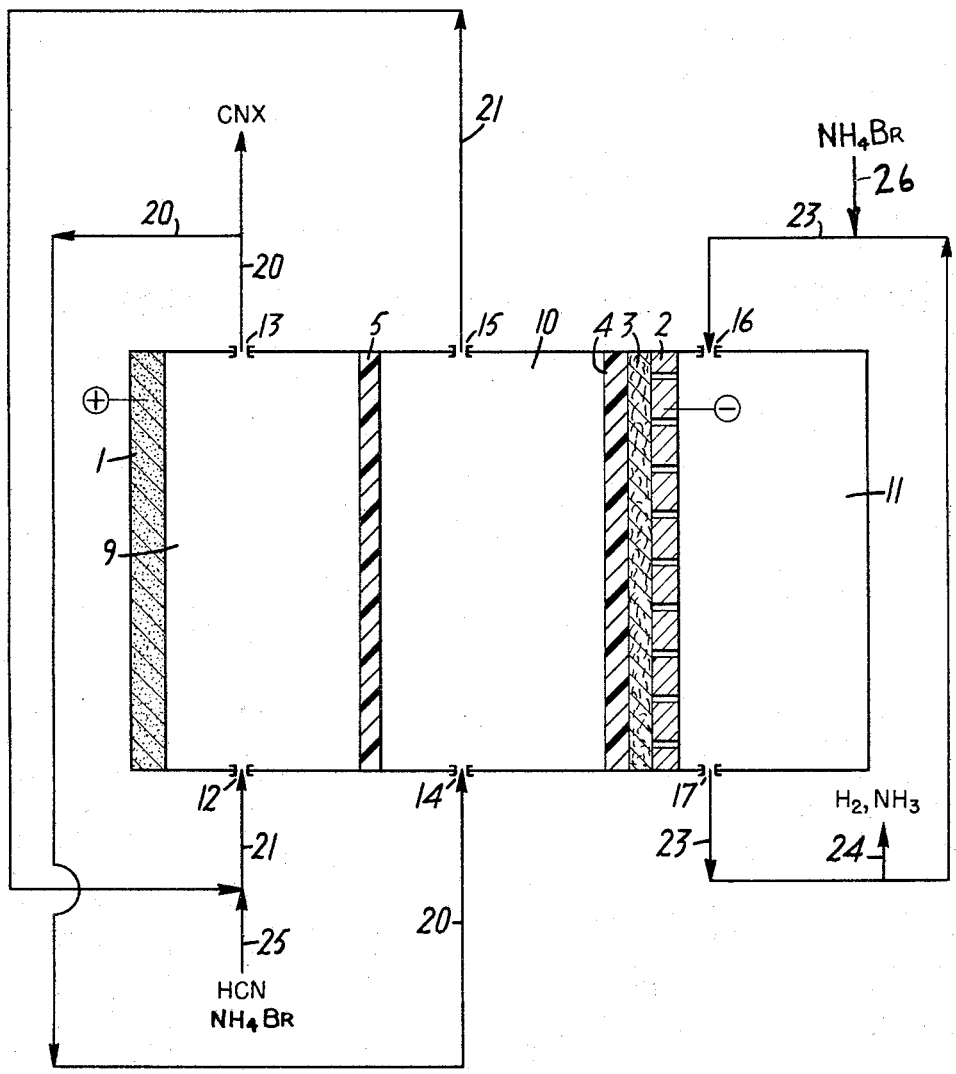

3,294,657
ELECTROLYTIC PROCESS OF MAKING CYANOGEN HALIDES
James W. Sprague, Streetsboro, and Franklin Veatch, University Heights, Ohio, assignors to The Standard Oil Company, Cleveland, Ohio, a corporation of Ohio
Filed Nov. 5, 1962, Ser. No. 235,364
3 Claims. (Cl. 204—101)

This invention relates to a compartmented electrochemical cell for use with incompatible electrolytes which must be kept separate, and to a method for the synthesis of cyanogen halide from hydrogen cyanide and ammonium halide, employing such a cell. More particularly, the present invention relates to an electrochemical cell having three compartments separated by permselective membranes.

In copending application Serial No. 162,333 filed Dec. 27, 1961 and now Patent No. 3,168,458, an electrochemical cell is provided having a perforated cathode in combination with an electrolyte absorbing separator disposed on one side, which is gas permeable and at the same time capable of maintaining an interfacial contact between the perforated cathode and the electrolyte, and a single permselective membrane barrier between the cathode compartment and anode compartment. This cell can be used for conversion of hydrogen cyanide and ammonium halide to cyanogen halide. When it is, however, difficulties arise. A single cation-selective membrane permits anolyte, i.e. water, hydrogen cyanide and cyanogen halide, to enter the catholyte, where the cyanides present a polymerization problem. A single anion-selective membrane is better, but does not separate adequately the ammonia and free halogen contained in the catholyte and anolyte respectively. This can result in deterioration of the membrane.

The present invention provides a compartmented cell for reactions such as the reaction of hydrogen cyanide and ammonium halide to produce cyanogen halide, hydrogen and ammonia.

This cell separates the anolyte compartment by an ion-selective membrane, preferably a cation-selective membrane, and the cathode compartment by an anion-selective membrane, with an electrolyte solution therebetween to carry the current between the anode and cathode compartments. The anion-selective membrane can be adjacent an electrolyte-absorbing separator which in turn lies against a perforated cathode. The other ion-selective membrane is spaced apart from said anode, and with the anion-selective membrane defines a central compartment.

When the anolyte is composed of an aqueous solution of hydrogen cyanide and ammonium halide, and the catholyte is a saturated ammonium halide solution, the products of the reaction at the cathode are ammonia gas and hydrogen, which are removed with the catholyte from the frame through the exit ports, and the product at the anode, removed with the anolyte, is cyanogen halide.

The electrolyte in the central compartment then desirably is anolyte from which cyanogen halide has been removed, which can then be fed in as anolyte recycle upon replenishment of ammonium halide and hydrogen cyanide. This has the advantage of utilizing an anolyte any hydrogen cyanide diffusing into it from the anolyte compartment and any ammonia diffusing into it from the cathode compartment. If desired, this ammonia can be converted to ammonium halide by addition of hydrogen halide to the anolyte, either before or after passing through the central compartment.

Thus, the anolyte in the preferred operation is fed from the cyanogen halide recovery unit through the central compartment before recycling to the anode compartment.

When this cell is employed for the electrochemical synthesis of cyanogen halide from hydrogen cyanide and ammonium halide, the reaction involved may be represented by the equation:

$$HCN + NH_4X + 2F \xrightarrow[\text{cell}]{\text{divided}} XCN + H_2\uparrow + NH_3\uparrow$$

where X is chlorine or bromine.

An anion-selective membrane between the central compartment and the cathode compartment prevents loss of anolyte to catholyte, which a cation-selective membrane would permit, and thus keeps the respective volumes of catholyte and anolyte substantially constant.

Anion-selective membranes in the presence of free halogen slowly form non-conductive halogen complexes which obstruct current flow. Cation-selective membranes do not and, accordingly, are the preferred member between anolyte and the central compartment. Other configurations are possible, this one being the best.

Use of a pair of permselective membranes without a moving electrolyte solution therebetween is not possible, since so much liquid accumulates between the membranes that the membranes burst. A drain line alone is insufficient, because of solids accumulation at the surfaces thereof. If the position of the membranes is reversed, no current flows.

FIG. 1 is a schematic cross-sectional view of a compartmented electrochemical cell in accordance with the invention.

The cell of the invention includes a perforated cathode preferably having guide portions on the surface for ensuring contact of a trickle flow of catholyte over the surface. The guide portions may be of such configuration that they form scoops, either regularly or randomly disposed from the surface, to intercept liquid trickling down over the surface and to guide it from one surface to the opposite surface through the perforations. The upper boundary of the cathode is provided with a header which permits catholyte to be recycled by trickling down over the adjacent surfaces of the cathode.

Disposed in contacting laminar relation with the perforated cathode is a gas and liquid permeable separator which may be composed of any inert highly porous material such as glass fibers, asbestos fibers, animal fibers, vegetable fibers, synthetic fibers or the like, which will soak up the catholyte passing through the perforations, and maintain the opposite surface of the cathode saturated with catholyte, and at the same time will itself become saturated with catholyte in order to provide a continuous ion-containing and conducting medium for the cell.

Absorbent felt materials made from various synthetic polymeric materials such as nylon, polyethylene glycol terephthalate and polyvinyl chloride-acrylonitrile may be used.

The separators may be any material having sufficient chemical stability and a liquid permeability of at least about 100 gallons of water per minute per foot square p.s.i. At values below this, the internal resistance of the cell increases undesirably.

Any conventional means for circulating the catholyte may be provided.

As the perforated cathode, a perforated metallic plate or a metallic screen can be used, which contains random or regularly spaced openings which will pass catholyte from one surface of the cathode to the absorbent separator.

While a simple metallic plate such as a perforated stainless steel plate has been found quite satisfactory, the surface of metallic materials may be activated by the deposition thereon of reaction and catalytic materials and surface multiplying agents such as platinum black, nickel black, and various metal oxides, etc. Metals of low hydrogen overvoltage are preferred.

A useful criterion in perforated cathode design is the ratio of the frontal electrode area excluding perforations, to the perforation diameter, which should be between about 10 and 25. The percent open area may range from about 10% to about 30% of the total area. These values are not critical, but are convenient guides in electrode design.

This cell conveniently takes the form of a plate and frame type laminar structure, although it will be understood that other forms of the cell may also be used. For example, circular plates rather than rectangular plates may be employed.

The anode may be porous, although the relationship of the pore size to the overall porosity of the perforated cathode and separator should be such that a positive pressure in the direction of the latter may be exerted, while maintaining the anode compartment filled.

The composition of the cathode and anode is, of course, controlled primarily by the necessity that it be resistant to chemical reaction, such as for example, with bromine or chlorine; but a variety of materials are available which meet this requirement, such as graphite, carbon, platinum, and titanium, stainless steel, etc.

The cathode materials found most suitable include 316 stainless steel screen, and "Conidure" carbon steel screen.

The anode and cathode compartments are separated by two permselective membranes.

Suitable electrical connectors are provided for the electrodes to enable attachment of the cell to any suitable external source of electrical energy, e.g., a direct current battery. Separate circulatory systems are provided for each of the electrolytes. With respect to the catholyte circulating means such as a pump is provided to circulate catholyte to a point where reaction products contained in the catholyte may be removed or stored, as desired.

In a similar manner, the anolyte is circulated through the anode compartment by means of a pump, conducting anolyte through the inlet ports and through the anode compartment to the outlets and to an anolyte storage and product removal tank.

Ion permeable membranes of the type which are employed in this invention are conveniently those membranes which are electrically conductive and permeable to ions, but which are not permeable to molecules. The more sophisticated ion-permeable membranes are known as permselective membranes, i.e., they are permeable to ions of a given charge but not to ions having the opposite charge. Hence, they are referred to as cationic or anionic, as the case may be, and both types are useful as the membranes in accordance with the present invention. An example of a specific ion-exchange resin barrier is as follows:

A mixture of about 95 parts by weight of styrene and about 5 parts by weight divinyl benzene was polymerized. The resulting polymer was comminuted to fine particles and 100 parts by weight of this finely-divided material was sulfonated by reaction with about 175 parts by weight of chlorosulfonic acid. The latter reaction was carried out by heating at reflux temperature for about 3 minutes and then maintaining the mixture at room temperature for 50 hours. The sulfonated product was then washed with a large excess of water to remove any remaining chlorosulfonic acids and any acid chlorides which were formed in the reaction. The sulfonated resin was then dried and 2 parts by weight of the dried resin were mixed with 1 part by weight of polyethylene and the resulting mixture was pressed into a sheet, which then serves as the membrane.

The preparation and description of permselective membranes is well known in the art and there are numerous patents relating to such membranes. Examples of such membranes are described in U.S. Patents Nos. 2,636,851; 2,636,852; 2,861,319; 2,861,320; 2,702,272; 2,730,768; 2,731,403; 2,731,411; 2,731,425; 2,732,351; 2,756,202; 2,780,604; 2,800,445; 2,820,756; 2,827,426; 2,858,264; 2,860,096; 2,860,097; 2,867,575; 2,894,289; 2,903,406; and 2,957,206.

Any of the membranes disclosed in the patents in the foregoing list may be employed in constructing the membranes used in the present invention.

The figure shows a three compartment cell having a graphite anode 1, a perforated stainless steel plate cathode 2, felt separator 3, anion-selective membrane 4, and cation-selective membrane 5. Cathode 2 is in contact with felt 3, which is in contact with anion-selective membrane 4. Spaced apart from anion-selective membrane 4 is cation-selective membrane 5. Thus, the cell is divided into three compartments, an anode compartment 9, a central compartment 10 between membranes 4 and 5, and a cathode compartment 11. The anode compartment 9 is provided with ports 12 and 13 for the passage of anolyte therethrough to lines 20 and 21, the central compartment 10 with ports 14 and 15 for the passage of anolyte therethrough to lines 20 and 21, and cathode compartment 11 is provided with ports 16 and 17 for the passage therethrough of catholyte to lines 22 and 23. Cathode-generated gases are removed through port 17 in line 23, and recovered from line 23 through line 24, and the remainder of the catholyte recovered through line 23 is recycled through port 16 to the cathode compartment.

In the operation of the cell, when it is employed for the production of cyanogen halide, the recycle anolyte from which cyanogen halide has been stripped is introduced into central compartment 10 through port 14 and line 20. Anolyte from compartment 10 is removed through port 15 and line 21, combined with hydrogen halide, so as to convert ammonia entering such anolyte from the cathode compartment to ammonium halide, and fresh hydrogen cyanide fed from line 25 and introduced through port 12 into the anode compartment 9. Cyanogen halide-rich anolyte is withdrawn through port 13 and line 20, and after separation of cyanogen halide is recycled through line 20 to central compartment 10.

The catholyte from cathode compartment 11 is removed through port 17 and line 23. Hydrogen and ammonia are removed from line 23 through line 24, and the remainder of the catholyte is recycled to compartment 11 through line 23 and port 16. $NH_4Br$ is added to compartments 9 and 11, through lines 25 and 21 and lines 26 and 23, respectively, in order to maintain the desired bromide ion concentrations in the anolyte and catholyte.

In a specific example utilizing the cell shown in the drawing, the reactant materials may be hydrogen cyanide and ammonium bromide. For example, the electrolyte may be an aqueous solution of 72.6% water, 2.4% HCN, and 25% ammonium bromide. The catholyte may be a saturated aqueous solution of ammonium bromide which is fed to the upper port of the cathode, and then trickles down the cathode, penetrating the perforations and saturating the electrolyte-absorbent felt separator.

The positive pressure exerted by the anolyte in the central compartment 10 holds the membrane 5 firmly and evenly against the cathode. This prevents lateral motion of the membrane, and minimizes membrane attrition. In addition, the arrangement provides for the easy removal of gases through the absorbent separator, and the perforations in the cathode. Additional pressure differential across the cell may be provided in various ways, as for example, by means of auxiliary pumps. Vacuum may be applied to the gas cathode compartment to aid in gas removal. The pressure in the cathode compartment must be less than the pressure drop of the gas going through the cathode. Generally, less than about two pounds per square inch differential is sufficient. Maximum pressure is limited by the strength of the cell membranes.

Operable pressures are dependent upon the degree of porosity and size of pores of the cathode and the current density which controls the amount of gas produced at the cathode surface. The interpore distances may be increased at the expense of increased pressure differential across the cell membrane. With small interpore distances, there is more rapid gas clearance. The use of wire gauze as cathode construction material has been found to be particularly suitable from this standpoint, because of the rapid gas removal, its effective surface, and sufficient contact. With too small a pore size, there is an excessive rate of gas accumulation, and impractically high pressures across the cell barrier required to force the gas through the perforations and out of the cell.

The resultant effect of this cell structure creates high power efficiencies. With the use of the cell separator and membranes, short interelectrode distances may be utilized, so that advantage can be taken of the resulting decrease in cell voltage and in the overall size of the unit. Distances as short as $1/16$ of an inch may be employed without danger from an internal short circuit. In addition, pressure differential across the membrane and separator to the cathode permits the accumulation of only a minimum amount of gas. Since the operating voltage and the accumulation of gas in this space are in proportion, this effect also increases power efficiencies. The overall effect of this cell structure provides the maximum conductivity path between the separator and the cathode face, or the minimum operating voltage at a given current density, electrolyte concentration and temperature.

As for the conditions under which the cell is conveniently operated, it has been found that currents in the range of from 10 to 1,000 amperes per square foot are satisfactory and the preferred range is 30 to 500 amps. per square foot. The cell may be operated at voltages in the range of 2 to 6 volts, and the preferred voltage is in the range of from about 3 to about 4. In the electrochemical synthesis of cyanogen bromide from hydrogen cyanide, the actual voltage will be determined by the current density. The preferred temperature of operation is in the range of 20° to 75° C., it being understood that certain of the membranes employed as barriers are quite sensitive to temperature, and consequently the temperature at which reaction is carried out will be below that at which the membranes employed in the cell are disadvantageously affected. Most membranes exhibit quite satisfactory physical stability at temperatures within the preferred range, namely, 20° to 75° C.

We claim:

1. A process for the electrochemical reaction of hydrogen cyanide and ammonium halide to form cyanogen halide, using a three-compartment cell having an anode compartment and anolyte therein, a cathode compartment and catholyte therein, and an intermediate compartment therebetween with anolyte therein, an ion-selective membrane separating the anode compartment from the intermediate compartment, and an anion-selective membrane separating the cathode compartment from the intermediate compartment, which comprises subjecting an aqueous solution of hydrogen cyanide and ammonium halide as anolyte and an aqueous solution of ammonium halide as catholyte to a direct electric current to effect reaction in the anolyte to form cyanogen halide, withdrawing cyanogen halide-containing anolyte and recovering cyanogen halide therefrom, circulating such anolyte to the intermediate compartment to intercept hydrogen cyanide from anolyte moving towards the catholyte and ammonia from catholyte moving towards the anolyte, thereby preventing entry of the same into anolyte and catholyte, respectively, and then recycling to the anode compartment such hydrogen cyanide- and ammonia-enriched anolyte and hydrogen halide for electrochemical reaction to form cyanogen halide.

2. A process in accordance with claim 1 which comprises adding hydrogen halide to the anolyte prior to the interception step.

3. A process in accordance with claim 1 which comprises adding hydrogen cyanide and ammonium halide to the recycled anolyte to replenish that consumed in cyanogen halide formation.

References Cited by the Examiner

UNITED STATES PATENTS

| 641,571 | 1/1900 | Witter | 204—101 |
|---|---|---|---|
| 1,357,400 | 11/1920 | Jewell | 204—283 |
| 2,967,806 | 1/1961 | Osborne et al. | 204—263 |
| 3,017,338 | 1/1962 | Butler et al. | 204—98 |
| 3,105,023 | 9/1963 | Foreman et al. | 204—101 |

FOREIGN PATENTS 2,660 of 1895    1/1896    Great Britain.

JOHN H. MACK, *Primary Examiner.*

MURRAY TILLMAN, *Examiner.*

L. G. WISE, H. M. FLOURNOY, *Assistant Examiners.*